INVENTORS
Hoel L. Bowditch
Albert Allen
BY
Curtis, Morris & Safford
ATTORNEYS

United States Patent Office

3,105,508
Patented Oct. 1, 1963

3,105,508
PNEUMATIC RELAY
Hoel L. Bowditch, Foxboro, and Albert Allen, Sharon, Mass., assignors to The Foxboro Company, Foxboro, Mass., a corporation of Massachusetts
Filed Mar. 29, 1960, Ser. No. 18,270
5 Claims. (Cl. 137—82)

This invention relates to pneumatic relays for producing an output pressure signal corresponding to an input pressure signal.

Pneumatic relays of various types have for many years been incorporated in instrumentation systems used for measuring or controlling variable conditions of industrial processes. For example, pneumatic relays have been used to amplify a pneumatic signal, such as that produced by a flapper-nozzle sensing device, to a relatively high-powered signal for rebalancing the forces in the measuring instrument, or for operating a process-manipulating device such as a valve, etc.

The present invention is directed particularly to a pneumatic relay of the general type shown in U.S. Patent 2,631,570. The relay shown in this patent is superior to other conventional relays in that the shiftable valve elements are fully guided in their movements, thereby effectively eliminating frictional effects. Also, the area against which the lower-powered input pressure acts is substantially larger (by a factor of more than 10:1) than the area against which the opposing output pressure acts, thus providing high sensitivity to input pressure changes.

However, in the relay shown in the above-mentioned patent there is a steady "bleed" or loss of air to atmosphere which in practical embodiments may amount to about 0.6 cubic feet per minute. Although this loss is not in any sense prohibitive, in installations where large numbers of relays are used the additional air supply capacity required to handle the total air bleed for all of the relays may be economically significant. The present invention is directed to solving this and related problems.

Accordingly, it is an object of this invention to provide an improved pneumatic relay. Another object of this invention is to provide a pneumatic relay having low friction effects, high sensitivity, and in which there is effectively no "bleed" of air. Other objects, advantages and aspects of this invention will in part be pointed out in, and in part apparent from, the following description of a preferred embodiment of the invention, considered together with the accompanying drawings, in which.

Figure 1:
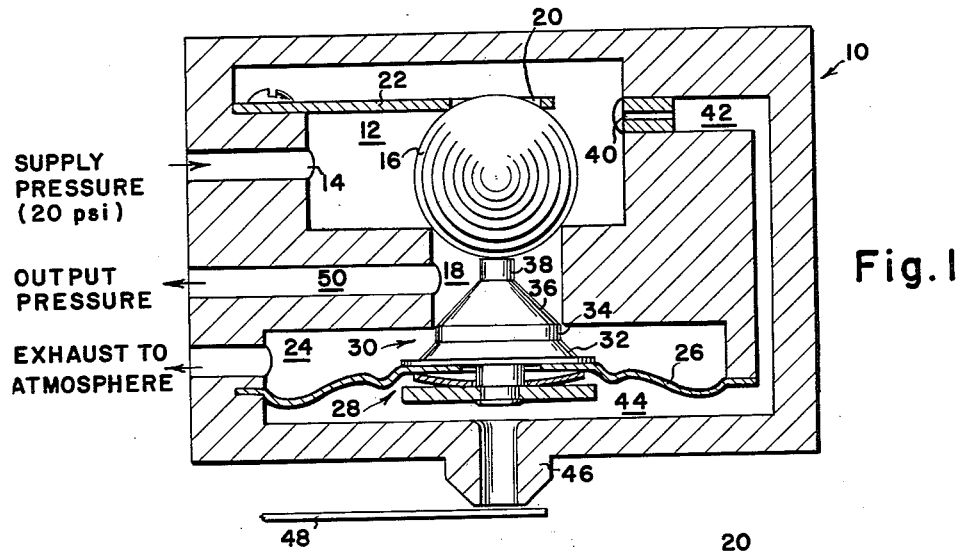
FIGURE 1 is a diagrammatic cross-sectional view of a relay constructed in accordance with this invention.

Referring now to FIGURE 1, the relay includes a housing 10 having a pressure supply chamber 12 which communicates through an inlet conduit 14 with a supply of air under pressure (not shown). Within chamber 12 is a ball valve body 16 adapted to seat against the upper end of a cylindrical passage 18 to seal off this passage and prevent the flow of air around the ball valve. The upper part of the ball valve is received within an aperture 20 in a cantilever spring member 22, the other end of which is fastened to housing 10.

At the other end of the passage 18 is an exhaust chamber 24 including a diaphragm 26 which is held firmly at its peripheral edges. The center of this diaphragm is apertured to receive a laterally-slidable mounting assembly 28 carrying a valve body 30 adapted for longitudinal movement in the passage 18. This valve body includes a conical base portion 32, a cylindrical central portion 34 dimensioned to fit with minimum clearance within passage 18, a conical top portion 36, and a stem 38 adapted to contact the underside of the ball valve 16 to move it upwards against the pressure of spring 22. As will be explained, the mounting assembly 28 provides automatic self-alignment of the valve body 30 with respect to passage 18.

Communicating with pressure supply chamber 12 is a flow restrictor 40 through which air may pass to a conduit 42 leading to an input pressure chamber 44 beneath diaphragm 26. Housing 10 also is provided with a nozzle 46 which controls the flow of air from this latter chamber in accordance with the positioning of a flapper 48 relative to the mouth of the nozzle. When this flapper is moved up towards the nozzle, the rate of air flow through the nozzle will be decreased, and hence the pressure drop across restrictor 40 will decrease so as to increase the pressure in chamber 44. Conversely, when the flapper is moved farther away from the nozzle, the pressure in chamber 44 will be decreased.

Connecting with the interior of passage 18 is an output pressure port 50 through which the relay output signal is transmitted to the load device being controlled, e.g. a conventional diaphragm-operated valve motor. The magnitude of the output pressure signal is determined by the positioning of flapper 48 in the manner to be explained hereinbelow.

FIGURE 1 shows the valve bodies 16 and 30 in their neutral position wherein both ends of passage 18 are substantially sealed against air flow. That is, the ball valve 16 is seated against the upper end of passage 18, and the other valve body 30 is so positioned that the upper edge of its central portion 34 is directly opposite (aligned with) the lower edge of the passage 18. Because the central portion 34 is congruent with passage 18 and dimensioned to fit with minimum clearance therein, the amount of air which can bleed past valve body 30 will be extremely small, typically in the range of 0.1 to 0.2 cubic feet per minute.

Since in this neutral position no air can pass by ball valve 16, the air bleeding past valve body 30 will tend to decrease the pressure in the load device supplied by the relay. Thus, it will be evident that this neutral position of the valve bodies does not provide a stable output condition. To stabilize the load pressure at a desired value, it is only necessary to shift the two valve bodies up very slightly, thus moving the ball valve 16 a small distance away from its seated position, and also moving the central valve body portion 34 farther into passage 18. This movement will not effectively change the restriction to air flow presented by valve body 30, due to the fact that the cylindrical central portion 34 will still be the same distance from the side walls of passage 18. Accordingly, it will be apparent that the ball valve need be moved up only to a position where the amount of air passing around the ball equals the small amount of air bleeding past the other valve body 30, i.e. 0.1 to 0.2 cubic feet per minute. The actual position of the ball for this amount of air flow will of course be dependent upon the magnitude of pressure applied to the load device, but in any event the ball will be so very near to its seated position that it can be considered to substantially seal the upper end of passage 18.

This positioning of the valve bodies 16 and 30 to obtain a desired load pressure ordinarily will be effected by conventional automatic control means (not shown herein) arranged to adjust the spacing between flapper 48 and nozzle 46. For example, if the load device supplied by the relay requires an increase in pressure, the flapper will be moved up towards the nozzle to decrease the air flow through the nozzle, and thereby increase the pressure in input chamber 44 beneath diaphragm 26. This increase in input pressure forces diaphragm 26 upwards, which in turn moves valve body 30 farther into passage 18 and shifts ball valve 16 away from the upper end of this passage. Throughout this movement, the lower end of passage 18 will remain substantially sealed against air flow due to the close fit of central valve body portion 34. However, the upward movement of ball valve 16 allows gradually increasing amounts of air to flow through the output 50 to the load.

Figure 2:
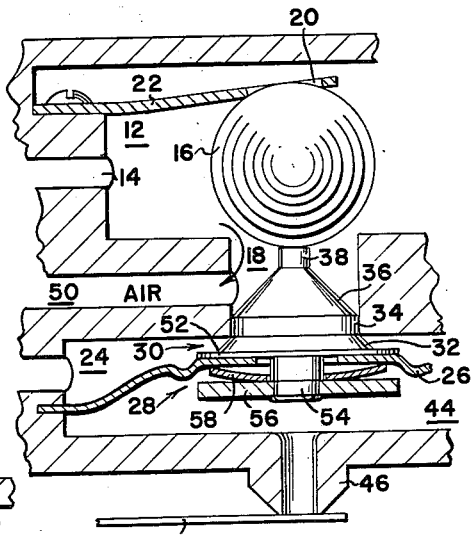
FIGURE 2 is a partial view of the relay shown in FIGURE 1, with the valve elements positioned for maximum input pressure condition.

If a substantial increase in load pressure is required, the flapper 48 may be moved up tight against nozzle 46 as shown in FIGURE 2, so that the pressure in input chamber 44 ultimately will equal the supply pressure. This will cause the valve body 30 to be shifted to its extreme upper position, with its base portion 32 seated against the lower edge of passage 18 to completely shut off the flow of air into the exhaust chamber 24. At the same time, ball valve 16 is moved so far away from its valve seat that it presents only a very small restriction to the flow of air through passage 18 and output port 50 to the load device. Thus this arrangement is adapted to supply air at a high rate to the load device.

When the pressure in the load device has reached the desired value, flapper 48 will be moved down away from nozzle 46, thereby causing the input pressure in chamber 44 to decrease and permit valve bodies 16 and 30 to be moved down by spring 22. By means of the usual automatic control means, the flapper 48 ultimately will be so located relative to nozzle 46 that the valve bodies 16 and 30 will be positioned to produce in passage 18 a pressure equal to that desired at the load device, i.e. the valve bodies will be virtually in the neutral position shown in FIGURE 1, but slightly offset to provide a stable output condition.

If it is desired to decrease the pressure in the load device, the flapper 48 is moved farther away from nozzle 46. This increases the air flow through the nozzle, and correspondingly increases the pressure drop across restrictor 40. The input pressure in chamber 44 thereupon drops, and the pressure in passage 18 acting on valve body 30 forces this valve body down and away from the lower opening of passage 18. This downward movement allows spring 22 to press ball valve 16 firmly into seating engagement with the upper edge of passage 18, thereby completely shutting off any flow of air around the ball valve into this passage.

Figure 3:
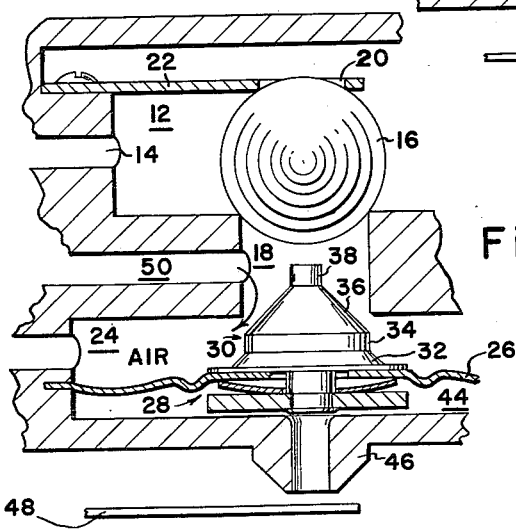
FIGURE 3 is a partial view of the relay shown in FIGURE 1, with the valve elements positioned for minimum input pressure condition.

If flapper 48 is moved sufficiently far away from nozzle 46, the pressure in chamber 44 will drop essentially to atmospheric and, as shown in FIGURE 3, valve body 30 will be forced down a substantial distance away from the lower opening of the passage 18. Thus this valve body will present only a very small restriction to the flow of air from the load device, through port 50 and passage 18, and out through the exhaust chamber 24 to atmosphere. Consequently, the pressure in the load device will quickly decrease to the desired new pressure, at which time the flapper 48 will be moved back up to restabilize the valve bodies 16 and 30 effectively in their neutral position as shown in FIGURE 1, but slightly offset to maintain the pressure in passage 18 at the new value desired for the load device.

From the above description, it will be evident that a relay constructed in accordance with this invention will waste only a very small amount of air during operation. There are two factors involved in achieving this result. First, the lower valve body 30 is provided with a portion (34) dimensioned to fit closely within passage 18 and to move freely therethrough while substantially sealing the passage. Second, the stem 38 has a predetermined length such that, as the lower valve body is moved up towards the passage 18 from the position shown in FIGURE 3, the stem will not contact ball valve 16 until the central portion 34 is in the passage. This dimensional relationship is shown in FIGURE 1, wherein the upper edge of central portion 34 is aligned with the lower edge of passage 18, the stem 30 is in contact with ball 16, and this ball is seated in the upper opening of passage 18.

Accordingly, with this construction one or the other end of passage 18 always will remain at least substantially sealed against the flow of air. That is, if the valve body 30 is moved down from its neutral position shown in FIGURE 1, ball valve 16 will remain seated to prevent air flow from chamber 12 into passage 18. On the other hand, if valve body 30 is moved up from its neutral position, the central portion 34 of this valve body will merely move farther into the passage but still maintain the lower end of the passage substantially sealed against any air flow. And if valve body 30 is moved up to its extreme position shown in FIGURE 2, its conical base portion 32 will seat against the lower opening of passage 18 to completely shut off the flow of air around this valve body.

To assure correct alignment between the valve body 30 and passage 18, the valve mounting assembly 28 is free to slide laterally on diaphragm 26 so that, when conical base portion 32 is pressed up against the lower edge of passage 18 as shown in FIGURE 2, the base portion will automatically be shifted to a centered position coaxial with the passage. For this purpose, mounting assembly 28 includes a flat upper plate 52, which engages diaphragm 26 throughout a substantial area, and a mounting stud 54 which extends down from plate 52 through the central aperture in the diaphragm. The lower portion of this stud has a reduced diameter to receive a rigid washer 56, and the end of the stud is peened over to hold the washer firmly in place. Between washer 56 and diaphragm 26 is a conical dished spring plate 58 (of the type sometimes referred to as a "Belleville washer") the compression of which maintains the diaphragm firmly seated against upper plate 52. A small amount of silicone grease is applied between the diaphragm and the upper plate to assure proper sealing.

After the relay has been assembled, a pressure of 20 p.s.i. is applied to chamber 44 to shift diaphragm 26 and valve body 30 upwards, and jam the base portion 32 tightly against the lower edge of passage 18. If the valve body 30 was originally misaligned, i.e. off-center with respect to passage 18, the self-centering action of conical base portion 32 will automatically shift the valve body 30 the necessary distance laterally to provide alignment of the parts. This alignment normally will be maintained during operation of the relay by the same self-centering action, or, if desired, the valve body can be secured in its aligned position by any one of several conventional methods.

It should be noted that the disclosure herein is intended to be illustrative of the invention, and hence the drawings are somewhat diagrammatic in form in order to simplify the presentation and description of the invention. In a relay manufactured for sale on the commercial market, actual construction details of those parts not involved in the present invention, such as the arrangement of the various conduits, may preferably be in accordance with the arrangement disclosed in the above-mentioned U.S. Patent 2,631,570. Also, for some applications it may be desirable to provide the relay with a relatively wider throttling range, as by shortening the length of stem 38 slightly so that it will not contact ball valve 16 until central portion 34 has moved farther into passage 18, and by rounding off the lower edges of this passage along a radius somewhat smaller than the amount by which the stem was shortened. In any event, it is desired to emphasize that the disclosure of this application is not intended to be exhaustive or necessarily limitative; on the contrary, the showing herein is for the purpose of explaining the principles of the invention and thus to enable others skilled in the art to adapt the invention in such ways as meet the requirements of particular applications, it being understood that various modifications may be made without departing from the scope of the invention as limited by the prior art.

We claim:

1. A pneumatic relay of the type described and comprising a housing having a pressure supply chamber and an exhaust chamber, a passage having one end communicating with said supply chamber and its other end communicating with said exhaust chamber, an output pressure port leading out from said passage between its ends, a first valve body in said pressure supply chamber for controlling the opening at said one end, spring means urging said first valve body towards said one passage end, diaphragm means in said exhaust chamber arranged for movement towards and away from said passage, a second valve body extending into said other passage end, said second valve body having a base portion the sides of which are tapered with respect to the longitudinal axis of said passage, said base portion being wider than the opening at said other passage end so that said sides may engage the edges of the opening, stem means forming part of said second valve body and extending through said passage to contact said first valve body to move it away from said one passage end in response to movement of said second valve body towards said passage, and mountsaid first valve body towards said one pasasge end, diaphragm means, said mounting means including means to accommodate lateral shifting movement of said second valve body means relative to said diaphragm means, whereby to provide centering of said second valve body when it is forced up against said other passage end by the application of pressure to the reverse side of said diaphragm means.

2. A pneumatic relay of the type described and comprising a housing with a pressure supply chamber and an exhaust chamber, a passage having one end in communication with said supply chamber and its other end in communication with said exhaust chamber, an output pressure port communicating with said passage between its ends, a first valve body for controlling the opening at said one passage end, spring means arranged to urge said first valve body towards said one passage end, diaphragm means in said exhaust chamber and formed with an aperture adjacent said other passage end, a second valve body at said other passage end and arranged to be moved within said passage by said diaphragm means, said second valve body having a base portion formed with tapered sides adapted to engage the edges of said other passage end, said second valve body further including a second portion which is congruent with said passage and dimensioned to fit closely therewith, stem means secured to said second valve body to contact said first valve body and move it away from said one passage end, said stem means having a length such that as said second valve body moves towards said first valve body said stem means will contact said first valve body when said second portion is in said passage, and mounting means secured to said second valve body for attaching said second valve body to said diaphragm means, said mounting means including an element extending through said diaphragm means aperture and arranged to accommodate lateral sliding movement between said diaphragm means and said mounting means, so as to provide automatic centering of said second valve body when it is pressed against said other passage end by pressure applied to the opposite side of said diaphragm means.

3. A pneumatic relay as claimed in claim 2, wherein said base portion is provided with a flat plate in sealing engagement with said diaphragm means in the region thereof around the diaphragm aperture, a dished spring plate positioned on the opposite side of said diaphragm means to press said diaphragm means tightly against said plate, and rigid means secured to said mounting means element to hold said dished spring plate under compression.

4. A pneumatic relay for producing an output fluid pressure corresponding to an input fluid pressure, comprising a housing having a pressure supply chamber and an exhaust chamber, a passage interconnecting said two chambers, an output pressure port communicating with said passage between the supply and exhaust chamber ends thereof, said passage having a cylindrical section located between said exhaust chamber and said output pressure port, a first valve body located in said pressure supply chamber for controlling the flow of gas through the opening at the corresponding end of said passage, said first valve body being adapted to seat against said passage end to seal said opening, spring means arranged to urge said first valve body towards said opening; diaphragm means located in said exhaust chamber; a second valve body connected to said diaphragm means and extending into the exhaust chamber end of said passage, said second valve body having a base portion adjacent said diaphragm means to engage and seat against said other passage end and having a further cylindrical portion which is congruent with said cylindrical passage section and dimensioned to fit closely with minimum clearance in said passage section for movement therethrough, and a stem secured to said further portion of said second valve body to contact said first valve body and move it away from its corresponding opening in said passage, said stem having a length such that as said second valve body moves towards said first valve body the end of the stem will contact said first valve body when said further valve body portion is in said passage section and before said base portion seats against said other passage end.

5. A pneumatic relay for producing an output fluid pressure corresponding to an input fluid pressure, comprising a housing having a pressure supply chamber and an exhaust chamber, a passage interconnecting said two chambers, an output pressure port communicating with said pasasge between the ends thereof, said passage having a cylindrical section between said output pressure port and said exhaust chamber, a first valve body located in said pressure supply chamber for controlling the corresponding opening of said passage, said first valve body being adapted to seat against said opening, spring means arranged to urge said first valve body against said opening, diaphragm means located in said exhaust chamber, a second valve body connected to said diaphragm means and extending into said passage, said second valve body having a cylindrical portion which is congruent with said cylindrical passage section but slightly smaller in dimension so as to fit closely in said passage section and thereby provide unimpeded movement of said second valve body while substantially sealing said cylindrical passage section, a stem secured to the end of said second valve body remote from said diaphragm means to contact said first valve body and move it away from its corresponding opening in said passage, said stem having a length such that as said second valve body moves towards said first valve body the end of the stem will contact said first valve body when said cylindrical portion of said second valve body is in said cylindrical passage section, and pneumatic means for controlling the pressure on the side of said diaphragm means remote from said second valve body.

References Cited in the file of this patent

UNITED STATES PATENTS

| | | |
|---|---|---|
| 1,373,599 | Clark | Apr. 5, 1921 |
| 2,478,002 | Mott | Aug. 2, 1949 |
| 2,629,363 | McClay | Feb. 24, 1953 |
| 2,631,570 | Bowditch | Mar. 17, 1953 |
| 2,735,441 | Regna | Feb. 21, 1956 |
| 2,859,763 | Fites | Nov. 11, 1958 |
| 2,985,490 | Gates | May 23, 1961 |
| 2,991,800 | Becker | July 11, 1961 |
| 3,018,136 | Williams | Jan. 23, 1962 |
| 3,025,869 | Kenfield | Mar. 20, 1962 |